2,836,528

**FLOOR COVERINGS COMPRISING POLY-
ETHYLENE TEREPHTHALATE FILM**

Carlton Dudley Ford, Wilmington, Del., assignor to E. I.
du Pont de Nemours and Company, Wilmington, Del.,
a corporation of Delaware No Drawing. Application April 25, 1955
Serial No. 503,833

1 Claim. (Cl. 154—49)

This invention relates to floor coverings, and more particularly to floor coverings comprising a polyethylene terephthalate film bonded to a resilient base sheet.

One of the most widely used and least expensive types of floor covering is the so-called "printed-enamel felt-base" floor covering which comprises a printed oleo-resinous coating upon a resilient resin-impregnated non-woven fibrous backing, e. g., the backing normally comprises an asphalt-impregnated felt or paper. The coating or the wearing layer of the enameled floor covering is applied in thicknesses in the neighborhood of 0.006–0.007", and the coating is applied in a manner similar to the application of printing inks to paper and other base materials. The printed coating containing pigments and colors serves as the wearing surface of the enameled floor covering, and the coating contains the decorative pattern.

Although the enameled floor covering is widely used and is the most economical present day floor covering, its wearing qualities are poor and considerably inferior to those of the better types of linoleums and the homogeneous sheet floor coverings, such as the asphalt tiles and vinyl tiles.

An object of the present invention is to provide an economical type floor covering having outstanding wearing qualities. A further object is to provide a floor covering capable of being fabricated in a wide variety of decorative patterns. Other objects will be apparent from the description of the invention to follow.

The above objects are accomplished in accordance with the present invention by providing a decorative floor covering comprising a reverse printed layer or sheet of oriented, heat-set polyethylene terephthalate film bonded to a resilient backing.

The polyethylene terephthalate film layer of the floor covering of the present invention is one which has been oriented in both directions by stretching the film in two directions or by rolling in two directions or by stretching in one direction and rolling in the direction perpendicular thereto. The oriented film is heat-set by subjecting the film to a temperature of at least 150° C., preferably within the range from 150°–250° C., while restricting dimensional change. A preferred oriented film is one whose original dimensions have been increased at least 2.5 times (2.5×) in both directions by stretching and/or rolling. It is requisite that the oriented film be substantially balanced which means that the physical properties, such as tensile strength, tensile modulus, percent elongation, etc., should be substantially the same as measured in both directions. Oriented, heat-set, polyethylene terephthalate film, which is balanced, exhibits an outstanding resistance to degradation by many chemicals including moderately strong acids and brief exposures to strong alkalis. Furthermore, oils and greases will not adversely affect this film which constitutes the wearing surface of the floor covering.

The bond between the wearing layer of polyethylene terephthalate film and the resilient backing may be formed by employing a suitable adhesive composition, or the bond may be formed by softening the resin binder of the fibrous backing, and laminating the layers under heat and pressure. In most instances, however, a suitable adhesive composition is necessary since a uniform bond cannot, in general, be assured by merely softening the resin binder of the resilient backing and applying pressure to form the lamination. Numerous types of adhesive compositions may be employed including the synthetic rubber types, such as the butadiene/acrylonitrile copolymers, and the polyester types, such as polyethylene isophthalate or copolyesters of ethylene terephthalate and ethylene sebacate. Suitable polyester type adhesives are described and claimed in copending application U. S. Serial No. 453,440, filed August 31, 1945, in the name of Lucille Williams, now Patent No. 2,765,251, and U. S. Serial No. 462,009, filed October 13, 1954, in the name of C. E. Sroog. A modified type of butadiene/acrylonitrile copolymer adhesive suitable for purposes of this invention is described and claimed in U. S. Patent 2,673,826 to A. B. Ness.

Although the present compositions are in their most economical form when the present oriented polyethylene terephthalate film is bonded to an asphalt-impregnated felt or paper, it should be understood that the film may be laminated to other types of resilient backings, such as a natural rubber or synthetic rubber layer, or a vinyl resin layer, such as polyvinyl chloride, or to a cork layer. In laminating the film to these backing materials a non-printed film would probably be preferred as the wearing layer. Normally, the thickness of the wearing layer is the main factor to be considered, and the choice of a resilient backing material is based chiefly upon economic considerations unless an unusual degree of resiliency is required. In such cases a more expensive backing is needed, or a thicker asphalt-impregnated felt base would be required, i. e., thicker than the average felt base which is about 0.40".

The thickness of the wearing layer of oriented, heat-set polyethylene terephthalate film should be at least 0.001" and, normally should be between 0.001" and 0.003". These film thicknesses laminated to asphalt-impregnated felt form a product which is competitive economically with the printed-enamel felt-base floor coverings, and which is superior in wearing quality to the printed-enamel floor coverings. Obviously, if premium products are required, the thickness of the film wearing layer may be increased to thicknesses as great as 0.005–0.010".

To obtain the desired decorative pattern the polyethylene terephthalate film is reverse-printed with rotogravure type inks which may be modified to adhere strongly to the film. The type of pattern or design and the choice of colors used in this type of printing technique are substantially unlimited for the present floor coverings in contrast to the relatively limited number of decorative patterns which may be applied in the form of thick printed coatings of the type applied in fabricating enameled floor coverings. It is difficult to reproduce intricate designs and patterns when the printed layer must, as in enameled floor coverings, be thick enough to act as a wearing surface. That is, in the case of the enameled floor coverings, the thickness of the printed wearing layer must be at least 0.006" in order to provide a wearing surface capable of providing a certain minimum wear life. Applying a printed layer in such thicknesses substantially limits the intricacy of the design and the number of colors in the design. On the other hand, the reverse printed layer applied to the polyethylene terephthalate film of the present floor coverings is considerably thinner, and decorative patterns having intricate designs and multiple colors may readily be applied. The entire thickness of the film wearing layer protects the printed pattern, and the pattern is only distorted or disturbed when the entire thickness of the wearing layer has been worn through.

The term "reverse printed" or "reverse printing" is applied herein in its generally accepted meaning in the trade. That is, a "reverse printed" design is one which is in its proper prospective when viewed through the film surface opposite to the surface on which the printing is applied.

The transparency of oriented, heat-set polyethylene terephthalate film provides a clear medium through which the decorative pattern is visible. However, in some applications the glossy film surface may tend to reflect an excessive amount of light when the floor covering is in use. The mirror or highly reflective surface may be lightly embossed to reduce the amount of light reflected from its surface. This reduction in surface reflectiveness may be carried out by treating the film surface with an embossed (non-heated) roller or with a hot smooth roller or other hot body heated above the melting point of the film, as described and claimed in copending application U. S. Serial No. 455,240, filed September 10, 1954, in the name of C. B. Lundsager.

The discussion hereinabove has been devoted chiefly to the minimum structures of the present invention, that is, a reverse printed film bonded to a resilient backing. It should be pointed out, however, that specialty items are decidedly within the scope of the present invention, such items containing additional layers of sheet materials which influence the properties of the ultimate floor covering structure. For example, a reverse printed, oriented, heat-set polyethylene terephthalate film may be laminated to a metal foil, such as aluminum foil, and the foil layer may in turn be bonded to a paper layer, such as kraft paper. The paper layer may in turn be bonded to a resilient fibrous backing to form a floor covering sheet which resists scorching or burning when a high temperature heat source comes into contact with the film wearing layer, for example, when a hot cigarette is dropped upon the floor covering. The metal foil dissipates heat rapidly from the upper film surface.

The following examples illustrate specific embodiments of the present invention and are not to be construed as limiting the scope of the invention.

EXAMPLE 1

A polyethylene terephthalate film stretched 3× in both directions and heat-set under tension at 200° C. (thickness equal to 0.002") was reverse printed with a simulated wood grain pattern. The printed surface of the film was then laminated to an asphalt-impregnated felt base (thickness equal to 0.040") using an adhesive comprising a butadiene/acrylonitrile copolymer designated "Hycar" 1552 manufactured by the B. F. Goodrich Chemical Co. The adhesive layer was permitted to dry, and thereafter the felt base was laminated to the film by placing the layers in a platen press at 75° C. under a pressure of 350 lbs. per sq. inch for 10 seconds.

The resulting structure together with the following commercially available floor coverings was subjected to the Taber abrasion test which comprises revolving a CS-17 Carborundum wheel in contact with the wearing surface of the floor covering under a load of 1000 grams:

(1) Enameled flooring comprising an asphalt-impregnated felt base coated (printed) with an oleo-resinous paint (0.007" in thickness) by a modified letter press process using a wooden roller. The impregnated felt backing is coated on the back to prevent the asphalt from staining the underflooring. The thickness of the felt backing is about 0.058". The 0.007" printed coating is equivalent to about 1 pound of coating per square yard of area. The printed coating is exposed directly to abrasions which ultimately wear away the entire coating. This material is the most widely used and most economical type of floor covering (commercial sample 1).

(2) A composite covering comprising a felt backing having a wearing surface of polyvinyl chloride. The thickness of the vinyl compound was 0.006" (commercial sample 2).

(3) A three sheet structure wherein the resilient backing is an asphalt-impregnated felt, the center layer is a printed paper coated with a resin (this layer carries the decorative pattern), and the top layer is polyvinyl chloride having a thickness of 0.006" (commercial sample 3).

(4) Lightweight inlaid linoleum (commercial sample 4).

The following table (Table I) illustrates the superior wear resistance of the floor covering of the present invention over the widely used enameled flooring. Commercial samples 2-4, inclusive, all retail at approximately the same price which is above that of commercial sample 1.

*Table I*

| Type of Floor Covering | Thickness of Wearing Layer, Inches | Type of Resilient Backing | Total Thickness, Inches | Taber Abrasion Cycles to Wear Through the Wearing Layer |
|---|---|---|---|---|
| Polyethylene Terephthalate reverse printed (Example 1) | 0.002 | felt backing | 0.046 | 2,750 |
| Commercial Sample (1) | 0.007 | do | 0.065 | 1,775 |
| Commercial Sample (2) | 0.006 | do | 0.059 | 2,825 |
| Commercial Sample (3) | 0.006 | do | 0.066 | 2,800 |
| Commercial Sample (4) | 0.028 | do | 0.071 | 2,250 |

EXAMPLE 2

A polyethylene terephthalate film 0.002" in thickness (stretched 3× in both directions and heat-set at 200° C.) was reverse printed with a rotogravure type printing ink to impart a simulated wood grain pattern upon the film. This ink was especially adherent to the film and was manufactured by the Commercial Ink Co. The underside of the reverse printed layer was then laminated to an asphalt-impregnated felt backing. To five parts of a rubber latex adhesive No. M-654 (manufactured by the Union Paste Co.) was added one part of titanium dioxide pigment. The adhesive was applied to the felt base with a paint brush, thoroughly dried by exposing the surface to a blast of hot air, and the film was laminated to the felt base by placing the composite in a platen press maintained at 75° C. for 5-10 seconds under a pressure of 200 pounds per square inch.

EXAMPLE 3

A reverse printed polyethylene terephthalate film of the type described in Example 2 was laminated to aluminum foil with a suitable adhesive, and the foil layer was in turn laminated to a sheet of brown kraft paper. This structure was then placed on top of an asphalt-impregnated felt, and using no adhesive the composite was laminated together under the same conditions recited in Example 2 except that the time in the press was 30 seconds.

The following table, Table II, illustrates the superior wear resistance of the structures of Examples 2 and 3 relative to a commercial enameled floor covering.

*Table II*

| Type of Floor Covering | Thickness Of Wearing Layer, Inches | Type of Resilient Backing | Taber Abrasion Cycles to Wear Through the Wearing Layer |
|---|---|---|---|
| Control: Enameled flooring | 0.006 | Felt | 850 |
| Example 2 | 0.002 | Felt | 2,400 |
| Example 3 | 0.002 | Felt | 3,100 |

EXAMPLE 4

The structure of Example 3 was fabricated except that an adhesive was applied to the felt backing to adhere the kraft paper surface of the film/foil/paper lamination to the felt backing. The adhesive used was National Adhesive No. 5OR2632 (a lacquer type rubber base adhesive), and the application and conditions of lamination were similar to those described in Example 2.

EXAMPLE 5

The structure of Example 3 was fabricated except that an adhesive was employed to adhere the kraft paper layer to the felt backing. In this case Polymer Industries "Polybond" B654 (a rubber latex adhesive) was employed as the adhesive and the conditions of lamination were the same as described in Example 2.

It should be emphasized that the floor covering compositions of the present invention may be used in end uses where other commercial floor coverings are commonly employed. These end uses include table tops, counter tops, drain boards, splash boards, wall coverings, valance coverings, protective coverings for shelves, linings for closets, and general interior decorations.

I claim:

A composite sheet structure suitable as a floor covering consisting of a top layer of reverse printed, biaxially oriented, balanced, heat-set polyethylene terephthalate film, an intermediate adhesive layer of a butadiene/acrylonitrile copolymer, and a bottom layer of asphalt-impregnated felt.

References Cited in the file of this patent

UNITED STATES PATENTS

| | | |
|---|---|---|
| 1,985,480 | Carpenter | Dec. 25, 1934 |
| 2,166,819 | Miller | July 18, 1939 |
| 2,472,551 | Smith | June 7, 1949 |
| 2,497,376 | Swallow et al. | Feb. 14, 1950 |
| 2,527,398 | Chavannes | Oct. 24, 1950 |
| 2,652,711 | Gessler et al. | July 31, 1951 |
| 2,650,213 | Hofrichter | Aug. 25, 1953 |
| 2,696,452 | Trepp | Dec. 7, 1954 |
| 2,702,580 | Bateman | Feb. 22, 1955 |
| 2,719,100 | Banigan | Sept. 27, 1955 |